(12) United States Patent
Braun

(10) Patent No.: US 9,748,835 B2
(45) Date of Patent: Aug. 29, 2017

(54) DIGITAL POWER FACTOR CORRECTION

(71) Applicant: Infineon Technologies Austria AG, Villach (AT)

(72) Inventor: Christoph Braun, Munich (DE)

(73) Assignee: Infineon Technologies Austria AG, Villach (AT)

( * ) Notice: Subject to any disclaimer, the term of this patent is extended or adjusted under 35 U.S.C. 154(b) by 283 days.

(21) Appl. No.: 14/543,476

(22) Filed: Nov. 17, 2014

(65) Prior Publication Data

US 2016/0141952 A1 May 19, 2016

(51) Int. Cl.
*H02M 1/42* (2007.01)
*H02M 1/00* (2006.01)

(52) U.S. Cl.
CPC .. *H02M 1/4225* (2013.01); *H02M 2001/0003* (2013.01); *Y02B 70/126* (2013.01)

(58) Field of Classification Search
CPC ............... H02M 3/157; H02M 3/156; H02M 2001/0012; H02M 2001/0022; H02M 1/4225; H02M 2001/0003; H03F 3/217; H03F 2200/351; Y02B 70/126
See application file for complete search history.

(56) References Cited

U.S. PATENT DOCUMENTS

| | | | |
|---|---|---|---|
| 5,003,454 A | 3/1991 | Bruning | |
| 5,646,513 A * | 7/1997 | Riggio, Jr. | ............ H02M 3/156 323/282 |
| 2005/0012546 A1* | 1/2005 | Jeong | ...................... H03F 3/217 330/10 |
| 2007/0036212 A1* | 2/2007 | Leung | ..................... H02M 1/42 375/238 |
| 2007/0096812 A1* | 5/2007 | Lee | ............................ H03F 1/26 330/251 |
| 2009/0027117 A1* | 1/2009 | Andersen | ................... H03F 1/26 330/10 |
| 2009/0091382 A1* | 4/2009 | Determan | ............... H03F 1/304 330/10 |
| 2009/0289709 A1* | 11/2009 | Khoury | ................... H03F 3/217 330/251 |
| 2011/0216558 A1 | 9/2011 | Uno | |

FOREIGN PATENT DOCUMENTS

DE 10327620 A1 8/2004

OTHER PUBLICATIONS

Salabeigi, I., et al., "Improvement of Dynamic Response of SDM-based PFC Converter Using Digital Controller," IEEE Region 8 SIBIRCON, 4 pages; Jul. 2010, Irkutsk Listvyanka, Russia.

* cited by examiner

*Primary Examiner* — Adolf Berhane
*Assistant Examiner* — Henry Lee, III
(74) *Attorney, Agent, or Firm* — Slater Matsil, LLP

(57) ABSTRACT

A circuitry for providing a power factor correction is suggested. The circuitry includes a digital pulse width modulator, a switching element, a control unit, and a combiner. An output of the digital pulse width modulator is connected to the switching element. The combiner determines a combined signal based on an output of the control unit and an input signal. The combined signal is conveyed towards the digital pulse width modulator. An output of the switching element provides a feedback signal for the digital pulse width modulator and for the control unit such that an error in the feedback signal is reduced.

26 Claims, 5 Drawing Sheets

DIGITAL POWER FACTOR CORRECTION

TECHNICAL FIELD

Embodiments of the present invention relate to various examples in the field of digital power factor correction (PFC).

SUMMARY

A first embodiment relates to a circuitry for providing a power factor correction. In this embodiment, the circuitry includes a digital pulse width modulator, a switching element, a control unit, and a combiner. An output of the digital pulse width modulator is connected to the switching element. The combiner determines a combined signal based on an output of the control unit and an input signal. The combined signal is conveyed towards the digital pulse width modulator. An output of the switching element provides a feedback signal for the digital pulse width modulator and for the control unit such that an error in the feedback signal is reduced.

Another embodiment relates to a method for providing a power factor. A combined signal is determined based on an output of a control unit and an input signal. The combined signal is conveyed towards a digital pulse width modulator. A feedback signal is determined for the digital pulse width modulator and for the control unit based on an output of the switching element such that an error in the feedback signal is reduced.

Another embodiment relates to a device configured to perform the method steps noted above. For example, a computer program product can be directly loadable into a memory of a digital processing device and include software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

Power factor correction (PFC) systems may utilize a continuous conducting mode (CCM) or a critical conducting mode. For high power applications and a reduced amount of electromagnetic interference (EMI), the continuous conducting mode may be preferred over the critical conducting mode.

However, the continuous conducting mode may require current sensing capabilities, which may lead to a considerable amount of analog circuits. Examples presented herein in particular suggest a more efficient solution for PFC in combination with such continuous conducting mode. Also, the examples described may be used for a discontinuous conducting mode (DCM).

Examples described may in particular utilize an estimation of a current instead of a measurement of said current. A control loop may be provided for current estimation purposes. The circuitry presented may be used to provide a power factor corrected signal for a voltage regulator, e.g., a DC/DC converter.

Examples presented herein may further utilize a kind of reverse mode digital class D amplifier with a net (rectified) sine wave as an input signal and the "original" power supply signal of the class D amplifier's power bridge as the boosted output signal. The input and output voltages may be sensed and a ripple of the boosted DC output voltage is used as a correction signal for the digital pulse width modulator.

As an option, the measured input voltage signal, which is used as an input signal for the PW modulator may be pre-distorted for an improved overall total harmonic distortion (THD) performance.

Hence, the digital class D principle may be utilized with transposed inputs and outputs to bring the current in shape with the voltage. This approach does not require information about the current wave; therefore no additional current information is required.

Figure 1:
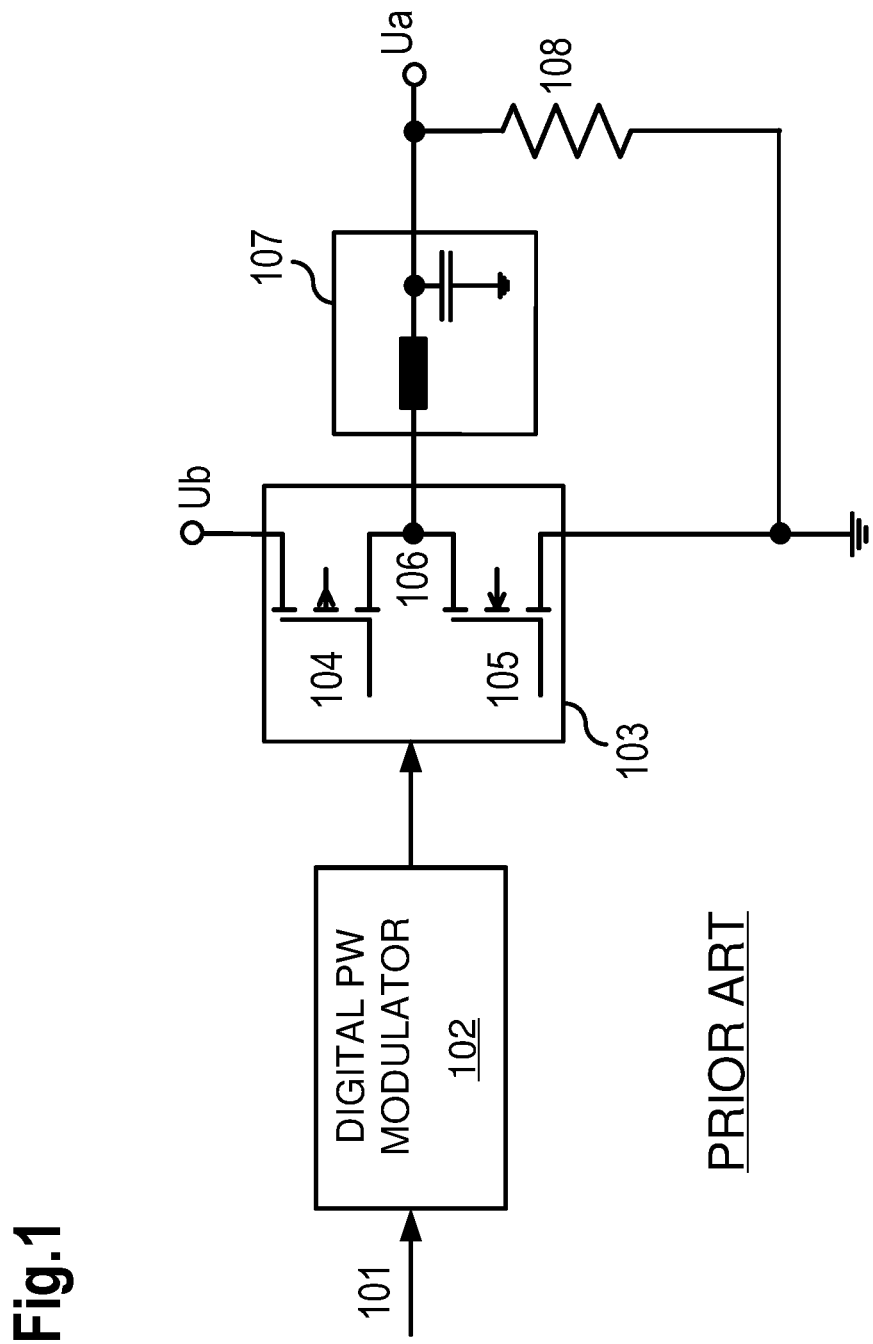
FIG. 1 shows basic blocks of a digital class D amplifier.

FIG. 1 shows basic blocks of a digital class D amplifier. A digital pulse code modulated (PCM) signal 101 is fed to a digital pulse width (PW) modulator 102 which conveys its output to a power stage 103. In the example shown in FIG. 1, the power stage 103 comprises two field effect transistors, a PMOS 104 and a NMOS 105 connected in series, wherein the source of the PMOS 104 is connected to a supply voltage Ub, the drain of the PMOS 104 is connected to a node 106 and to the drain of the NMOS 105 and the source of the NMOS 105 is connected to ground. The node 106 is connected to a low-pass filter 107 and the output of the low-pass filter 107 supplies an analog output voltage Ua that is connected to a load 108.

The digital PW modulator 102 may be a substantially linear closed loop architecture that transforms the PCM signal 101 to a PW-modulated signal that is amplified by the power stage 103 and re-converted into the analog output voltage Ua in case the supply voltage Ub is substantially constant. An exemplary embodiment of the digital PW modulator 102 is described in DE 103 27 620 A1, which is herewith incorporated by reference.

If the load 108 is a resistive load, the current wave has the same shape and phase as the output voltage Ua.

The following characteristics may be advantageously used with regard to examples as described herein:
(1) The PW modulation with a digital closed loop architecture has a substantially linear transfer function.
(2) Voltage and current waves are in phase and shape at the output of the class D amplifier (resistive load).

Figure 2:
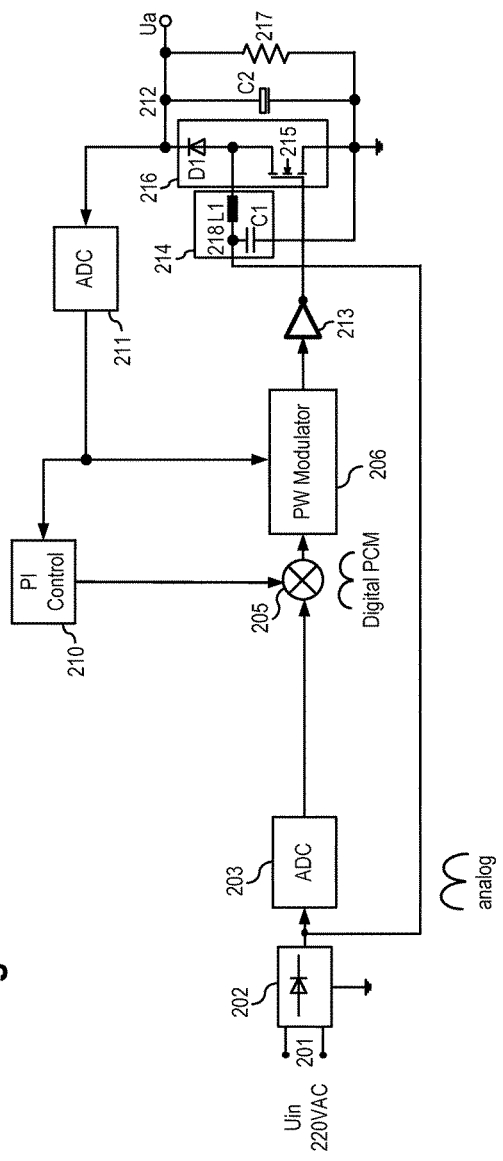
FIG. 2 shows a schematic diagram of a circuitry for PFC.

FIG. 2 shows a schematic diagram comprising an input voltage 201 (e.g., 220 VAC) that is fed to a rectifier 202 and the output of the rectifier 202 is conveyed to an analog-to-digital converter (ADC) 203. The digital output signal of the ADC 203 is combined by a multiplier 205 with an output signal of a PI control 210 ("PT" indicating that the control 210 comprises a proportional and an integrating portion). The result of the multiplication is conveyed to a PW modulator 206, the output of the PW modulator 206 is fed to the gate of an n-channel MOSFET 215 via an inverter 213. The source of the MOSFET 215 is connected to ground.

The drain of the MOSFET 215 is connected via a diode D1 to a node 212, wherein the cathode of the diode D1 is directed towards the node 212. At the node 212 an output voltage Ua is provided for a load 217 (which is connected across the node 212 and ground). Also, a capacitor C2 is connected in parallel to the load 217. The signal at the node 212 is also fed to an ADC 211 and the output of the ADC 211 is fed to the PI control 210 and to the PW modulator 206.

The output of the rectifier 202 (i.e. the analog signal) is connected to a node 218. The node 218 is connected via an inductor L1 to the drain of the MOSFET 215. The node 218 is further connected via a capacitor C1 to ground.

The capacitor C1 and the inductor L1 provide a filter (in particular a low-pass filter), the MOSFET 215 and the diode D1 establish a switching element 216, which may comprise at least one transistor. The diode D1 may be realized by a transistor (e.g., MOSFET), the switching element 216 may be a bridge circuit, in particular a half-bridge.

The example that is schematically depicted in FIG. 2 provides a digital PFC based on a class D principle with several modifications. The digital PCM signal at the output of the multiplier 205 (at the input of the PW modulator 206) is synchronized with the signal at the node 218.

With an appropriate PCM input, the class D amplifier generates an amplitude that equals to the amplitude of the input power. Hence, no current is flowing into the class D amplifier and the low-pass filter. If the amplitude of the class D amplifier is smaller than the amplitude of the input power, a current is flowing from the supply net into the class D amplifier with (substantially) the same shape and same phase as the voltage signal.

The (constant) supply voltage Ub of the class D amplifier according to FIG. 1 is replaced by the capacitor C2 and the load 217. The output of the digital PFC is hence provided across the load 217.

A current that is in shape with the rectified voltage wave of the power input signal (i.e., the output from the rectifier 202) is flowing into the low pass filter 214 thereby loading the capacitor C2. If the capacitor C2 has an appropriate size, the voltage ripple is small and the class D power stage modulation provided by the switching element 216 follows (exactly) the rectified power voltage. This is the basic functionality of a PFC system.

As an option, a p-channel MOSFET may be provided instead of the diode D1. Using the diode D1 instead, however, may have some advantage with regard to costs and implementation complexity of the switching element 216 (and hence the whole digital PFC circuitry).

If the voltage ripple at the output capacitor C2 is too high, this ripple is measured and used for compensation purposes, which compensation can be provided by the digital PW modulator 206. This mechanism may correspond to a kind of power supply rejection for a class D amplifier, i.e. inside the digital control loop of the PW modulator 206, the rippled "supply" voltage is emulated by the digital feedback loop of the PW modulator 206. This leads to a current being in shape with the supply voltage instead of a voltage ripple at the output capacitor C2.

Hence, the signal at the node 212 is converted by the ADC 211 into a digital signal that is used by the PW modulator 206 for such compensation purposes. For a regulation of the output voltage Ua, the output voltage Ua (which corresponds to the signal at the node 212) is measured and a PCM input for the digital PW modulator 206 (its gain) is controlled. Hence, the measurement of the signal at the node 212 can be used for compensating the ripple of the supply (input) voltage 201 and for adjusting the compensation gain for the PW modulator 206.

In addition, the digital signal is fed from the ADC 211 to the PI control 210. The PI control 210 provides a signal to the multiplier 205 for controlling the amplitude of the output of the multiplier 205. Hence, a control loop is established to adjust the signal at the node 212 via the PI control 210. The larger the signal at the node 212 (also referred to as boost signal) the smaller becomes the signal provided by the PI control 210 towards the multiplier 205 (and vice versa).

In case the resistance of the supply network is small (around 0 Ohm), ripple compensation may be required. If the resistance of the supply network is in the range larger than 5 Ohm, no ripple compensation may be required (because the resistance amounting to at least 5 Ohm in combination with the capacitor C2 already provide sufficient low-pass filtering).

Figure 3:
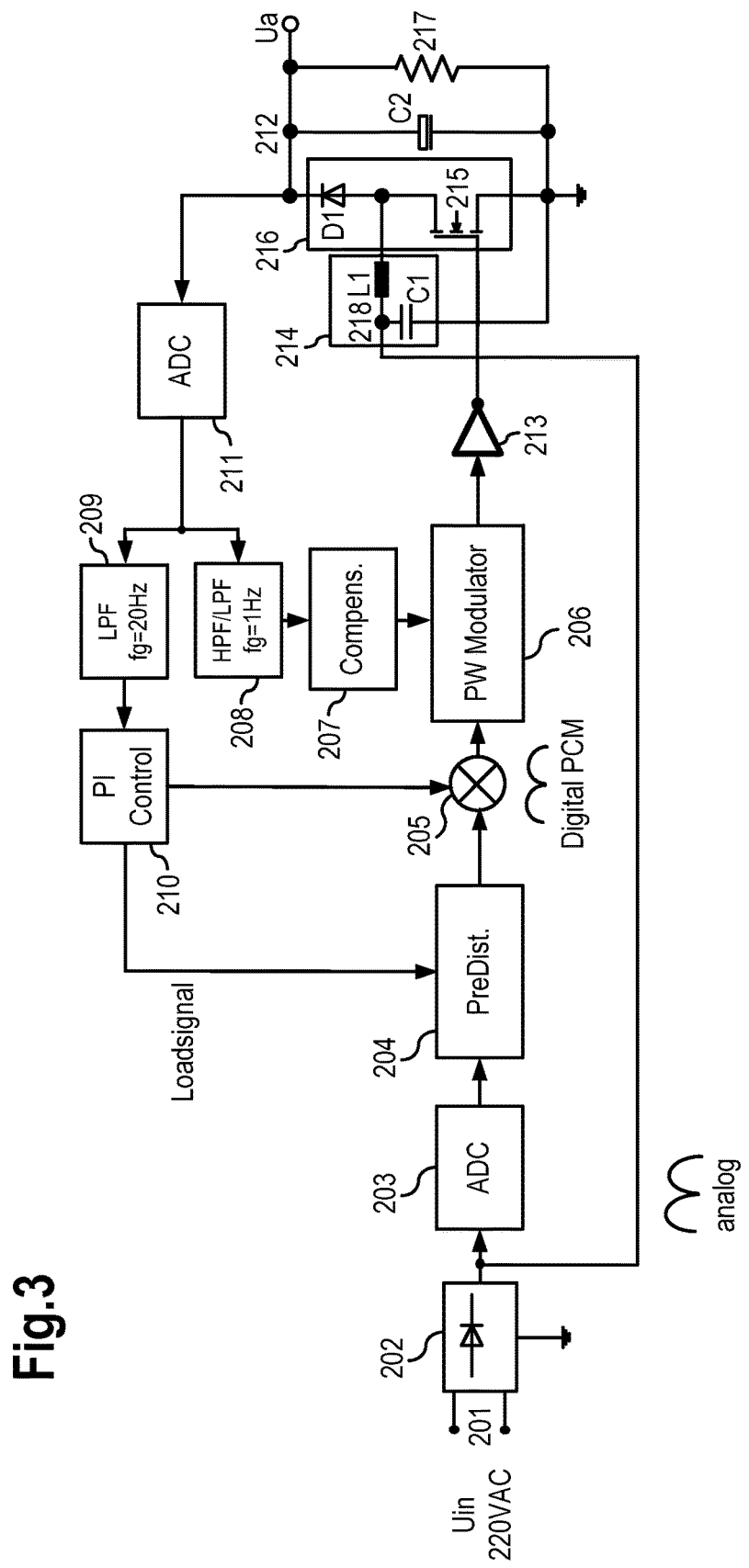
FIG. 3 shows a schematic diagram of a circuitry for PFC based on FIG. 2.

FIG. 3 shows a schematic circuit diagram based on FIG. 2. In addition to FIG. 2, the output of the ADC 203 is conveyed via a predistortion unit 204 to the multiplier 205. The PI control 210 also provides a loadsignal to the predistortion unit 204.

The predistortion unit 204 may be used to compensate a specific behavior of the diode D1 (which may be used instead of a p-channel MOSFET within the switching element 216). The diode D1 may show a characteristic that is compensated via a pre-distorted signal that is fed via the multiplier 205 to the PW modulator 206. The predistortion unit 204 may comprise a look-up table for compensating, e.g., a non-linear behavior of the diode D1. The PI control 210 determines the loadsignal as a derived measure from the load; in particular, the integration portion of the PI control 210 may be used to obtain such measure, because it reflects on the actual value of the load 217.

Also, the output of the ADC 211 is conveyed to the PI control 210 via a low pass filter 209 with an exemplary cutoff-frequency amounting to 20 Hz. This enables the PI control 210 to efficiently provide signals to the predistortion unit 204 and the multiplier 205 that are substantially unaffected by the 100 Hz ripple that may be part of the signal at the node 212.

In addition, the output of the ADC 211 is conveyed via a filter 208 and a compensation unit 207 to the PW modulator 206. The filter 208 may comprise a high-pass filter and/or a low-pass filter with an exemplary cutoff-frequency amounting to 1 Hz. The compensation unit 207 emulates the signal at the node 212 for the digital domain which is then processed by the PW modulator 206. This will be explained in further detail with regard to FIG. 4.

Hence, the filters 208 and 209 may be used to separate the voltage regulation bandwidth from the bandwidth of the ripple supply compensation thereby avoiding control interferences.

Figure 4:
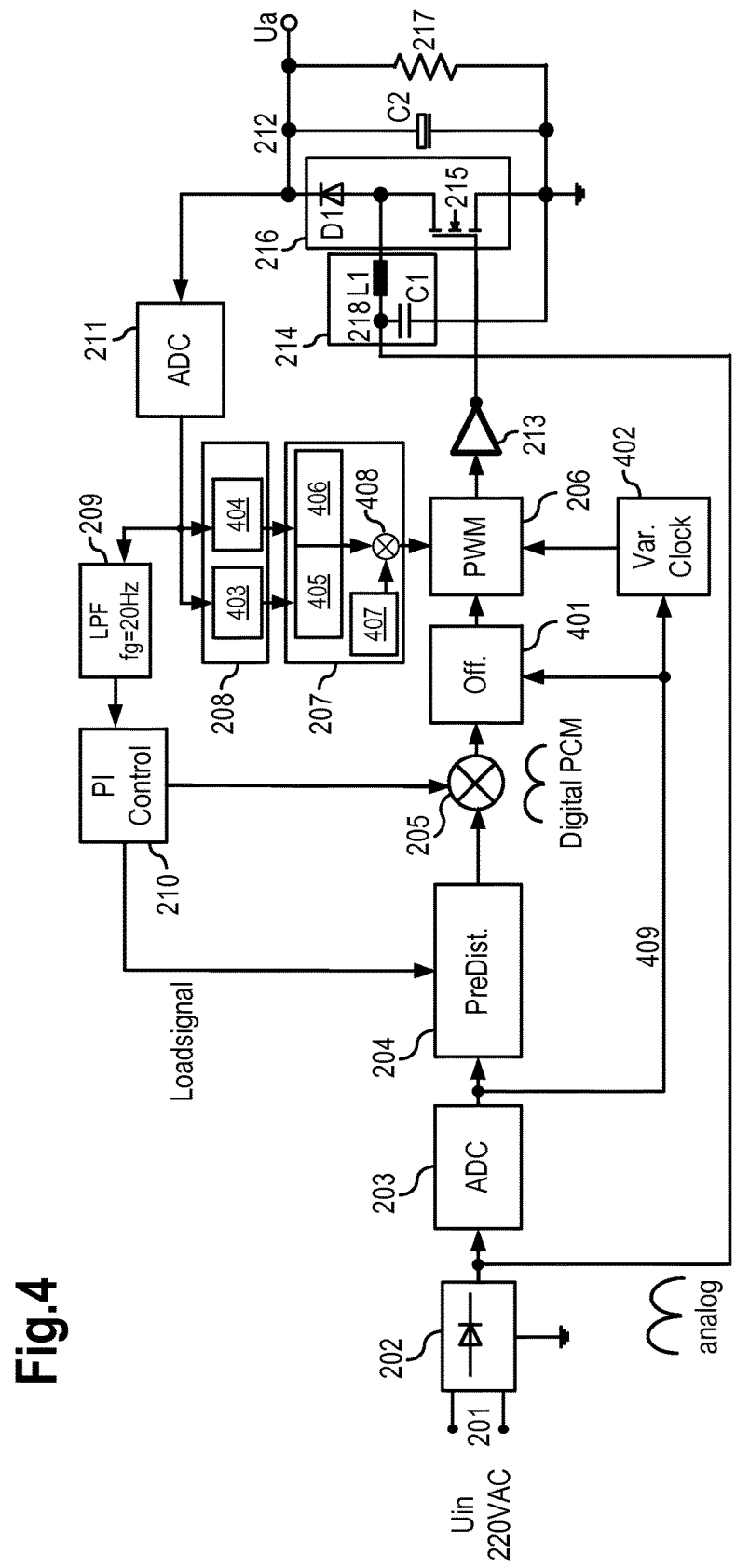
FIG. 4 shows a schematic diagram of a circuitry for PFC based on FIG. 3.

FIG. 4 shows a schematic circuit diagram based on FIG. 3.

In addition to FIG. 3, the filter 208 comprises a low-pass filter 403 and a high-pass filter 404 and the compensation unit 207 comprises an auto scaler 405, a ripple compensation unit 406 a compensation gain unit 407 and a multiplier 408.

The low-pass filter 403 has a cutoff-frequency amounting to 1 Hz and the high-pass filter 404 has a cutoff-frequency also amounting to 1 Hz. Hence, the low-pass filter 403 supplies a DC component of the digitized signal at the node 212 to the auto scaler 405 and the high-pass filter 404 supplies an AC component of the digitized signal at the node 212 to the ripple compensation unit 406. Hence, the auto scaler 405 and the ripple compensation unit 406 determine a ripple compensated signal to the multiplier 408. This ripple compensated signal emulates the ripple within the signal at the node 212. This ripple corresponds to an error which needs compensation. The signal at the node 212 is converted into the digital domain by the ADC 211 and the ripple compensation unit 406 "translates" the ripple for the PW modulator 206, wherein such translation comprises a scaling, which is conducted according to the DC component determined by the auto scaler 405. The DC component of the digitized signal at the node 212 may correspond to "1" in the PW modulator 206, which results in a calibration of the ripple for the PW modulator 206.

It is an option to provide the compensation gain unit 407 and the multiplier 408 in order to multiply the output of the auto scaler 405 and the ripple compensation unit 406 with a predetermined factor, which may be in the range between 1 and 2. It is also an option that the compensation gain unit 407 and the multiplier 408 are omitted; in such case the output of the combination of auto scaler 405 and ripple compensation unit 406 is connected to the PW modulator 206.

Further, FIG. 4 comprises an offset adjustment unit 401 and a variable clock generator 402. Both may optionally be connected to the output of the ADC 203. The variable clock generator 402 may control the clock and hence the PWM cycle (or frequency) of the PW modulator 206.

In order to utilize the circuitry for a wide range of input voltage applications, the offset and the frequency of the digital PWM may be adjusted. The offset adjustment unit 401 adds an offset after multiplier 205, i.e. after the multiplication of the pre-distorted input signal with the PI control signal. This offset may reduce the average PWM on-time of the switching transistor 215 thereby reducing the magnetic energy per cycle (i.e., per PWM period) in the inductor L1, which prevents the inductor L1 from reaching a magnetic saturation in case of higher input voltages.

Also the PWM frequency could be changed depending on the value of the input voltage 201. This is especially beneficial for low input voltages in order to enhance the efficiency of the PFC.

By utilizing different configurations for offset and PWM frequency, different PFC modes may be realized. For examples, offset and PWM frequency can be adjusted depending on the input voltage 201 to allow operation in either the CCM (Continuous Conducting Mode) or the DCM (Discontinuous Conducting Mode).

The CCM and the DCM may each require different offsets and PWM frequencies to operate efficiently in particular in case the inductor L1 has a considerable small amount of inductivity.

Figure 5A:
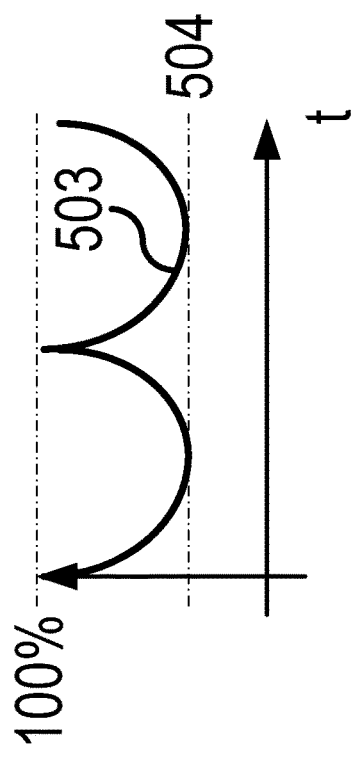
FIG. 5A shows a low-pass filtered PWM signal with a low offset.
Figure 5B:
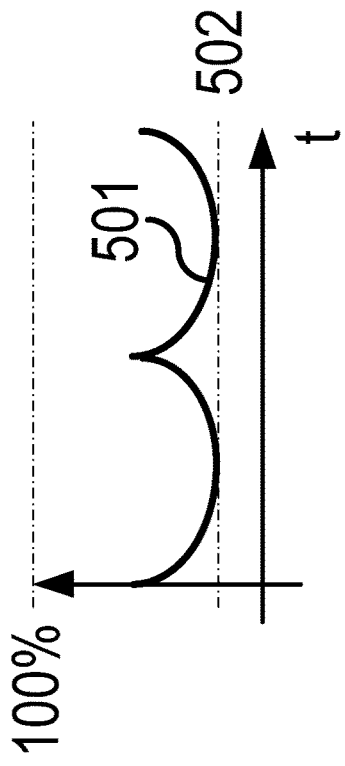
FIG. 5B shows a low-pass filtered PWM signal with a high offset.

FIG. 5A shows a low-pass filtered PWM signal 501 with a low offset 502 and FIG. 5B shows a low-pass filtered PWM signal 503 with a high offset 504.

For example, the offset of the PCM signal applied to the PW modulator 206 is manipulated to reduce the magnetic energy stored in the inductor L1 (utilizing a PWM frequency amounting to, e.g., 360 kHz). This may be advantageous in case of a high input voltage larger than 170 VAC.

In case of low AC input voltage (e.g., smaller than 170 VAC), the offset may be enlarged and the PWM frequency may be reduced to half the frequency (e.g., to 180 kHz), which may be beneficial for operating in the DCM mode. For DCM mode, the offset change alone may not result in reaching the higher boost voltage (i.e. voltage at the node 212), because of a lack of magnetic energy stored in the inductor L1. Reducing the PWM frequency, however, results in a longer charging time for the inductor L1 applied with each PWM cycle.

It is another option that the frequency (by the variable clock generator 402) and the offset (by the offset adjustment unit 401) are adjusted based on the signal 409 at the output of the ADC 203.

The examples suggested herein may in particular be based on at least one of the following solutions. In particular combinations of the following features could be utilized in order to reach a desired result. The features of the method could be combined with any feature(s) of the device, apparatus or system or vice versa.

A circuitry is suggested for providing a power factor correction includes a digital pulse width modulator, a switching element, a control unit, and a combiner. An output of the digital pulse width modulator is connected to the switching element. The combiner determines a combined signal based on an output of the control unit and an input signal. The combined signal is conveyed towards the digital pulse width modulator. An output of the switching element provides a feedback signal for the digital pulse width modulator and for the control unit such that an error in the feedback signal is reduced.

It is noted that the circuitry may be used in PFC scenarios. The accuracy of the PFC may be high, but does not have to be 100%. The circuitry may in particular provide a certain level of power factor correction, immediately or due to some delay which may be a result of the control loop's processing time.

The digital pulse width modulator may be a modulator as described in, e.g., DE 103 27 620 A1.

The combiner may be a modulator, in particular a multiplier.

The power factor corrected signal may be provided (for a PFC load) at the output of the switching element.

In an embodiment, the digital pulse width modulator and the switching element are part of a class D amplifier.

In an embodiment, the output of the switching element corresponds to a terminal for the supply voltage of a class D amplifier.

Hence, the terminal for providing the supply voltage for the switching element of the class D amplifier can be used as output of the PFC circuitry. It is noted that the input signal of the PFC circuitry may accordingly correspond an output signal of the class D amplifier.

In an embodiment, the circuitry further comprises a first analog-to digital converter for digitizing the output of the switching element and for conveying a first digitized signal towards the control unit and the digital pulse width modulator.

In an embodiment, the first digitized signal is conveyed towards the control unit via a first filter, in particular a low-pass filter.

This low-pass filter may have a cutoff-frequency below a ripple frequency of the signal at the output of the switching element.

In an embodiment, the first digitized signal is conveyed towards the digital pulse width modulator via a second filter and a compensation unit.

In an embodiment, the second filter comprises a high-pass filter and a low-pass filter.

Each of the high-pass filter and the low-pass filter of the second filter may have a cutoff-frequency amounting to 1 Hz. This allows separating the DC portion from a ripple which may both be part of the signal at the output of the switching element.

In an embodiment, the compensation unit determines a ripple compensated signal based on the output of the second filter.

The compensation unit emulates the signal at the output of the switching element for the digital domain which is then processed by the pulse width modulator.

In an embodiment, the compensation unit determines a ripple compensated signal based on the output of the second filter combined with a compensation gain signal.

In an embodiment, the input signal is a power supply signal.

In an embodiment, the circuitry further comprises a rectifier for rectifying the power supply signal and a second analog-to-digital converter for conveying a second digitized signal based on the rectified power supply signal towards the combiner.

In an embodiment, the rectified power supply signal is conveyed towards the switching element.

In an embodiment, the rectified power supply signal is conveyed towards the switching element via a third filter, in particular a low-pass filter.

In an embodiment, the control unit comprises a proportional and an integrating portion.

In an embodiment, a loadsignal is determined by the control unit based on its integrating portion, the loadsignal is conveyed towards a predistortion unit, which is arranged in the path between the input signal and the combiner.

In an embodiment, the predistortion unit is arranged to compensate a characteristic of the switching element or of at least one component of the switching element.

The predistortion unit may be used to pre-distort the signal based on loadsignal such that, e.g., a non-linear characteristic of a diode that is part of the switching element, is at least partially compensated.

In an embodiment, the output of the digital pulse width modulator is connected to the switching element via an inverter.

In an embodiment, the switching element comprises a full-bridge or a half-bridge arrangement comprising at least one electronic switching element and/or at least one diode.

It is noted that the electronic switching element may be a transistor, e.g., a bipolar transistor, a MOSFET, a semiconductor switch, a IGBT, etc. The half-bridge or full-bridge arrangement may comprise any number of n-type and/or p-type transistor(s).

In an embodiment, a power factor correction load is arranged between the output of the switching element and ground.

In an embodiment, a capacitor is arranged in parallel to the power factor correction load.

In an embodiment, the circuitry further comprises an offset adjustment unit that is arranged in a path between the combiner and the digital pulse width modulator.

In an embodiment, the offset adjustment unit is arranged to add an offset depending on the amplitude of the input signal.

For example, the rectified and analog-to-digital converted input signal may be conveyed to the offset adjustment unit for adjusting the amount of offset to be applied to the signal processed by the digital pulse width modulator.

In an embodiment, the circuitry further comprises a variable clock generator for providing a clock signal for the digital pulse width modulator or for adjusting the clock signal of the digital pulse width modulator.

In an embodiment, the variable clock generator is arranged to change the frequency of the clock signal depending on the amplitude of the input signal.

By utilizing different configurations for offset and PWM frequency, different PFC modes may be realized. For examples, offset and PWM frequency can be adjusted depending on the input signal to allow operation in either a CCM (Continuous Conducting Mode) or a DCM (Discontinuous Conducting Mode).

Also, a method for providing a power factor correction is provided. A combined signal is determined based on an output of a control unit and an input signal. The combined signal is conveyed towards a digital pulse width modulator. A feedback signal is determined for the digital pulse width modulator and for the control unit based on an output of the switching element such that an error in the feedback signal is reduced.

Further, a device is suggested that includes means for determining a combined signal based on an output of a control unit and an input signal, means for conveying the combined signal towards a digital pulse width modulator, and means for determining a feedback signal for the digital pulse width modulator and for the control unit based on an output of the switching element such that an error in the feedback signal is reduced.

In addition, a computer program product is provided, which directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A circuitry for providing a power factor correction comprising
   a switching element;
   a digital pulse width modulator, wherein an output of the digital pulse width modulator is coupled to the switching element;
   a control unit; and
   a combiner coupled to an output of the control unit to determine a combined signal based on an output of the control unit and an input signal, the combined signal being directed towards an input of the digital pulse width modulator in a forward control direction,
   wherein an output of the switching element provides a feedback signal for the digital pulse width modulator and for the control unit such that an error in the feedback signal is reduced,
   wherein the control unit comprises a proportional portion and an integrating portion, and
   wherein a loadsignal is determined by the control unit based on its integrating portion and wherein the loadsignal is coupled to an input of a predistortion unit, which is arranged in a path between the input signal and the combiner.

2. The circuitry according to claim 1, wherein the digital pulse width modulator and the switching element are part of a class D amplifier.

3. The circuitry according to claim 2, wherein the output of the switching element corresponds to a terminal for a supply voltage of a class D amplifier.

4. The circuitry according to claim 1, further comprising a first analog-to-digital converter coupled to the output of the switching element and providing a first digitized signal to the control unit and the digital pulse width modulator.

5. The circuitry according to claim 4, further comprising a low-pass filter coupled between the first analog-to-digital converter and the control unit.

6. The circuitry according to claim 4, further comprising a second filter and a compensation unit coupled between the first analog-to-digital converter and the control unit.

7. The circuitry according to claim 6, wherein the second filter comprises a high-pass filter and a low-pass filter.

8. The circuitry according to claim 6, wherein the compensation unit determines a ripple compensated signal based on an output of the second filter.

9. The circuitry according to claim 6, wherein the compensation unit determines a ripple compensated signal based on the output of the second filter combined with a compensation gain signal.

10. The circuitry according to claim 1, wherein the input signal is a power supply signal.

11. The circuitry according to claim 10, further comprising a rectifier coupled to receive the power supply signal and a second analog-to-digital converter coupled to provide a second digitized signal based on a rectified power supply signal to the combiner.

12. The circuitry according to claim 11, wherein the rectified power supply signal is towards the switching element in the forward control direction.

13. The circuitry according to claim 12, wherein the rectified power supply signal is directed towards the switching element via a low-pass filter in the forward control direction.

14. The circuitry according to claim 1, wherein the predistortion unit is arranged to compensate a characteristic of the switching element or of at least one component of the switching element.

15. The circuitry according to claim 1, further comprising an inverter, wherein the output of the digital pulse width modulator is connected to the switching element via the inverter.

16. The circuitry according to claim 1, wherein the switching element comprises a full-bridge or a half-bridge arrangement comprising an electronic switching element and/or a diode.

17. The circuitry according to claim 1, wherein a power factor correction load is arranged between the output of the switching element and ground.

18. The circuitry according to claim 17, further comprising a capacitor arranged in parallel with the power factor correction load.

19. The circuitry according to claim 1, further comprising an offset adjustment unit that is arranged in a path between the combiner and the digital pulse width modulator.

20. The circuitry according to claim 19, wherein the offset adjustment unit is arranged to add an offset depending on the amplitude of the input signal.

21. The circuitry according to claim 1, further comprising a variable clock generator coupled to provide a clock signal for the digital pulse width modulator or to adjust the clock signal of the digital pulse width modulator.

22. The circuitry according to claim 21, wherein the variable clock generator is arranged to change the frequency of the clock signal depending on the amplitude of the input signal.

23. A method for providing a power factor correction, the method comprising:
   determining a predistorted signal based on an input signal and a loadsignal;
   determining a combined signal based on an output of a control unit and the predistorted signal, wherein the control unit comprises a proportional portion and an integrating portion;
   determining the loadsignal by the control unit based on its integrating portion;
   directing the combined signal towards an input of a digital pulse width modulator in a forward control direction; and
   determining a feedback signal for the digital pulse width modulator and for the control unit based on an output of a switching element such that an error in the feedback signal is reduced.

24. A device comprising a processor and a memory storing software code portions for executing steps of the method according to claim 23 on the processor.

25. A computer program product directly loadable into a memory of a digital processing device, comprising software code portions for performing the steps of the method according to claim 23.

26. A device comprising:
   means for determining a predistorted signal based on an input signal and a loadsignal;
   means for determining a combined signal based on an output of a control unit and the predistorted signal;
   means for determining the loadsignal by the control unit based on its integrating portion;
   means for directing the combined signal towards an input of a digital pulse width modulator in a forward control direction; and
   means for determining a feedback signal for the digital pulse width modulator and for the control unit based on an output of a switching element such that an error in the feedback signal is reduced.

* * * * *